United States Patent [19]
Kobayashi

[11] Patent Number: 5,436,807
[45] Date of Patent: Jul. 25, 1995

[54] VARIABLE-LIGHT-BEAM-PATTERN FOUR-LAMP TYPE HEADLAMP SYSTEM

[75] Inventor: Shoji Kobayashi, Shizuoka, Japan

[73] Assignee: Koito Manufacturing Co., Ltd., Tokyo, Japan

[21] Appl. No.: 53,698

[22] Filed: Apr. 29, 1993

[30] Foreign Application Priority Data

Apr. 30, 1992 [JP] Japan .................... 4-036797 U

[51] Int. Cl.⁶ ............................................ B60Q 1/24
[52] U.S. Cl. ................................ 362/41; 362/66; 362/69
[58] Field of Search ................ 362/37, 41, 66, 69; 315/82

[56] References Cited

U.S. PATENT DOCUMENTS

| | | | |
|---|---|---|---|
| 4,809,139 | 2/1989 | Ryder et al. | 362/66 |
| 4,903,173 | 2/1990 | Mochizuki et al. | 362/66 |
| 4,943,893 | 7/1990 | Shibata et al. | |

FOREIGN PATENT DOCUMENTS

| | | | |
|---|---|---|---|
| 3041795 | 6/1982 | Germany . | |
| 3601388 | 7/1987 | Germany | 362/66 |
| 4041012 | 7/1991 | Germany . | |
| 0111546 | 4/1989 | Japan | 362/66 |
| 257489 | 9/1926 | United Kingdom | 362/66 |

*Primary Examiner*—Stephen F. Husar
*Assistant Examiner*—Sara Sachie Raab
*Attorney, Agent, or Firm*—Sughrue, Mion, Zinn, Macpeak & Seas; Richard C. Turner; Marie-Claire Boisvert

[57] ABSTRACT

In a variable-light-beam-pattern four-lamp type headlamp system with two lamps juxtaposed on each side of a vehicle and in which the two lamps are projection lamps with reflectors, the direction of the reflector of at least one of the two projection lamps is changed to deflect the output light beam thereof vertically and/or horizontally, and the two projection lamps are on-off controlled, with the one projection lamp being controlled in its distribution of light so that the output light beam of the two projection lamps are combined to provide a light distribution pattern, whereby formation of a dark region is prevented.

4 Claims, 6 Drawing Sheets

VARIABLE-LIGHT-BEAM-PATTERN FOUR-LAMP TYPE HEADLAMP SYSTEM

BACKGROUND OF THE INVENTION

The present invention relates to a variable-light-beam-pattern four-lamp type headlamp system having two lamps mounted on each side of a vehicle.

A headlamp system has been known in which, to illuminate the road in wet weather, as shown in FIG. 11, the central axis of the light beam is inclined downward or obliquely downward with respect to its angle for normal illumination with its cutoff maintained unchanged. In a headlamp of this type, the light beam for illuminating the road is obtained, for instance, by inclining the central axis of the reflector of a projection lamp with respect to the center O of the light distribution pattern.

In wet weather, the light beam of the above-described headlamp is deflected downward and/or downward and sideward so as to better illuminate the near part of the road. As a result, the distant part of the road (indicated by an arrow A) is lower in luminance. Thus, the distant part is lower in visibility, and the side of the road (indicated by an arrow B), which is opposite to the side to which the light beam has been deflected, is also lower in luminance. Accordingly the visibility is often insufficient when the vehicle turns to the right.

Moreover, since the conventional headlamp is intended to provide the necessary luminance with only one lamp, the power consumption of the light source, namely, the light bulb, is large, 50 to 80 W, and therefore a large load is imposed on the electrical system of the vehicle.

SUMMARY OF THE INVENTION

In view of the foregoing, an object of the invention is provide a variable-light-beam-pattern four-lamp type headlamp system in which the overlap of the different output light beams of two lamps is controlled to change the distribution of light according to whether the road is wet or dry.

Another object of the invention is to provide a variable-light-beam-pattern four-lamp type headlamp system in which the light beam pattern is changed in association with the steering of the vehicle and according to the conditions of the road, so that the light distribution pattern is changed according to the traveling conditions of the vehicle.

The foregoing and other objects of the invention have been achieved by the provision of a variable-light-beam-pattern four-lamp type headlamp system with two lamps juxtaposed on each side of a vehicle, in which, according to the invention, the two lamps are projection lamps each having a reflector, reflector driving means is provided to change the direction of the reflector of at least one of the two projection lamps thereby to deflect the output light beam thereof vertically and/or horizontally, and the two projection lamps are on-off controlled, while the light distribution pattern of one of the projection lamps is controlled so that the output light beams of the two projection lamps are combined.

In the headlamp system of the invention, the two lamps on each side of the vehicle are a stationary-light-beam type projection lamp and a movable-light-beam type projection lamp. When the output light beam of the movable-light-beam type protector lamp is deflected, the output light beam of the stationary-light-beam type projection lamp is sufficient to eliminate the dark region which otherwise would be present. Hence, when the light beam is deflected downward or sideward to illuminate the near part of the road in wet weather, the difficulties are eliminated that the distant part of the road is lowered in luminance and reduced in visibility, or the side of the road opposite to the side to which the light beam has been deflected is lowered in luminance, and accordingly the visibility is insufficient when the vehicle turns to the right.

The nature, principle, and utility of the invention will be more clearly understood from the following detailed description of the invention when read in conjunction with the accompanying drawings.

DESCRIPTION OF THE PREFERRED EMBODIMENTS

Preferred embodiments of the invention now will be described with reference to the accompanying drawings.

A first example of a variable-light-beam-pattern four-lamp type headlamp system constructed according to the invention is as shown in FIGS. 1 through 6.

Figure 1:
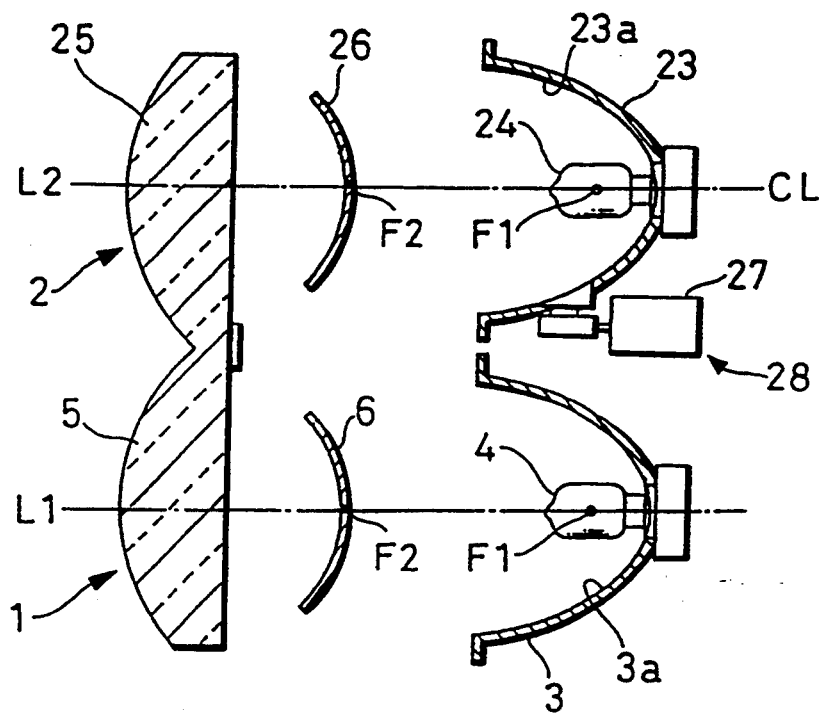
FIG. 1 is a sectional plan view for a description of a first example of a variable-light-beam-pattern four-lamp type headlamp system, showing first and second projection lamps on each side of a vehicle.

In the headlamp system of the invention, a lamp unit on one side of the vehicle, as shown in FIG. 1, includes a first projection lamp 1 and a second projection lamp 2 located horizontally beside the first projection lamp 1. The first projection lamp emits a fixed light beam, and a second projection lamp 2 emits a light beam which is movable in a vertical plane.

The first projection lamp 1 has a stationary reflector 3 having an elliptic reflecting mirror surface 3a, a light bulb 4 mounted fixedly on the bottom of the stationary reflector 3 in such a manner that it is positioned at the first focal point F1 on the optical axis L1 of the stationary reflector 3, a collimator lens 5 disposed on the optical axis L1 and in front of the first focal point F1, and a shade 6 positioned at the second focal point F2 between the light bulb 4 and the collimator lens 5. The shade 6 defines the sectional configuration of the output light beam of the light bulb.

Figure 2:
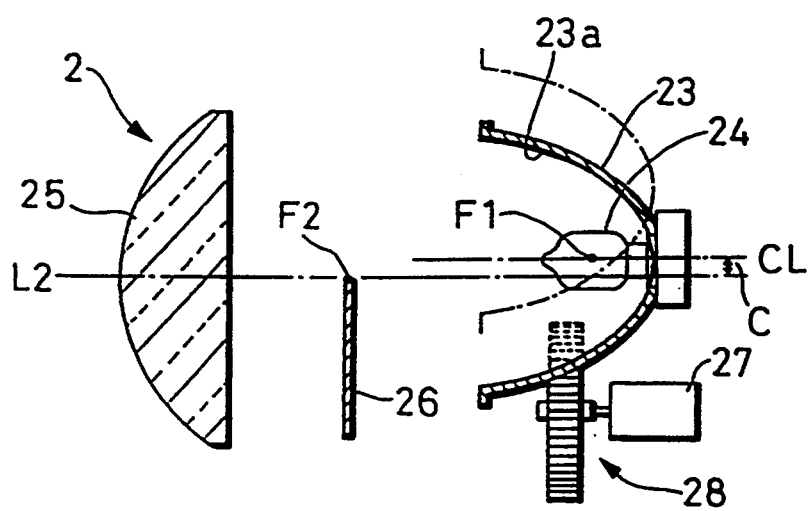
FIG. 2 is a longitudinal sectional view showing the second projection lamp.
Figure 3:
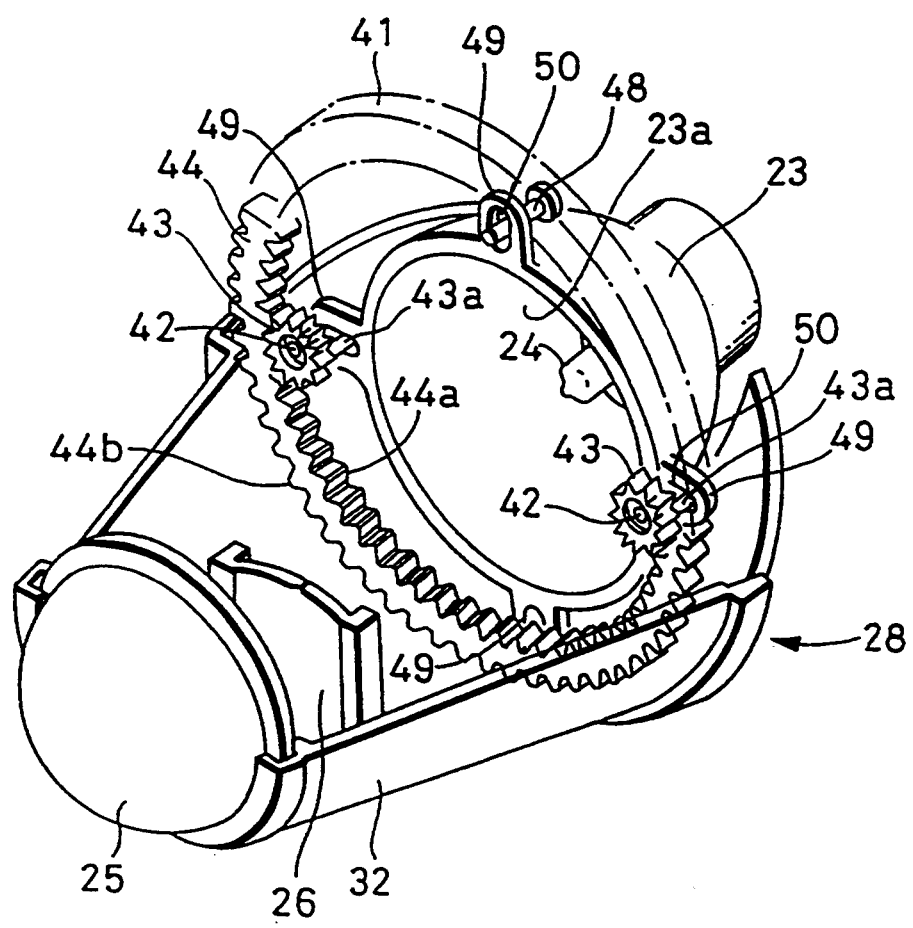
FIG. 3 is a perspective view, with parts cut away, showing an example of a reflector driving device for the movable reflector of the second projection lamp shown in FIG. 2.
Figure 4:
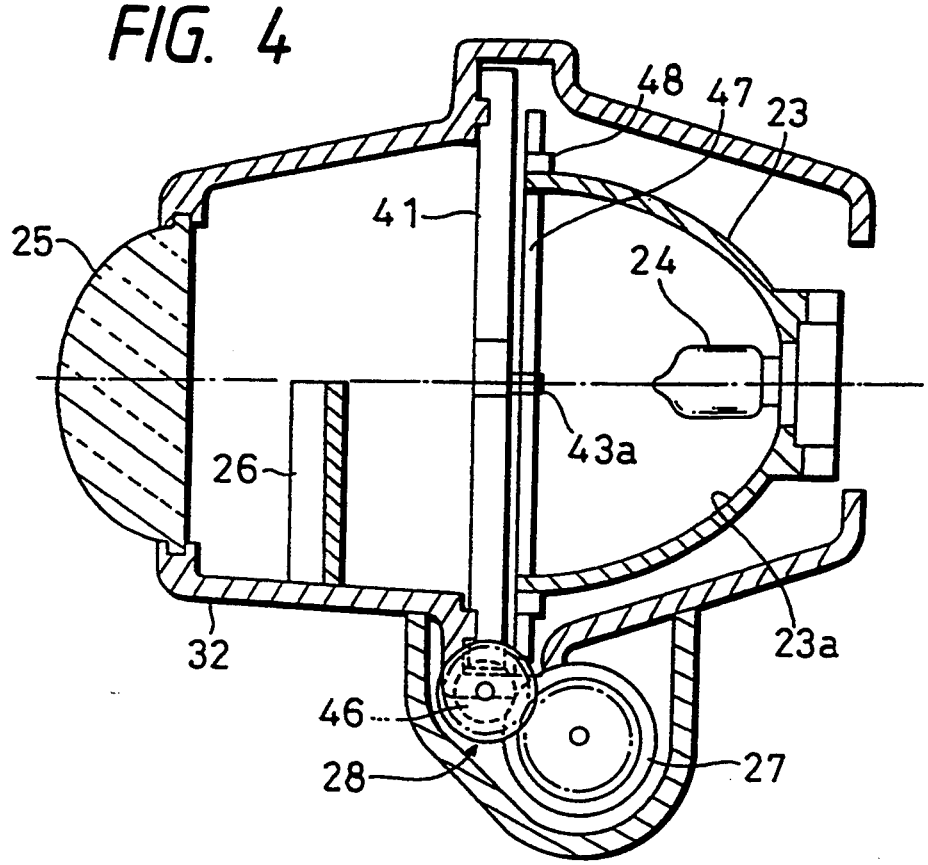
FIG. 4 is a longitudinal sectional view of the reflector driving device.
Figure 5:
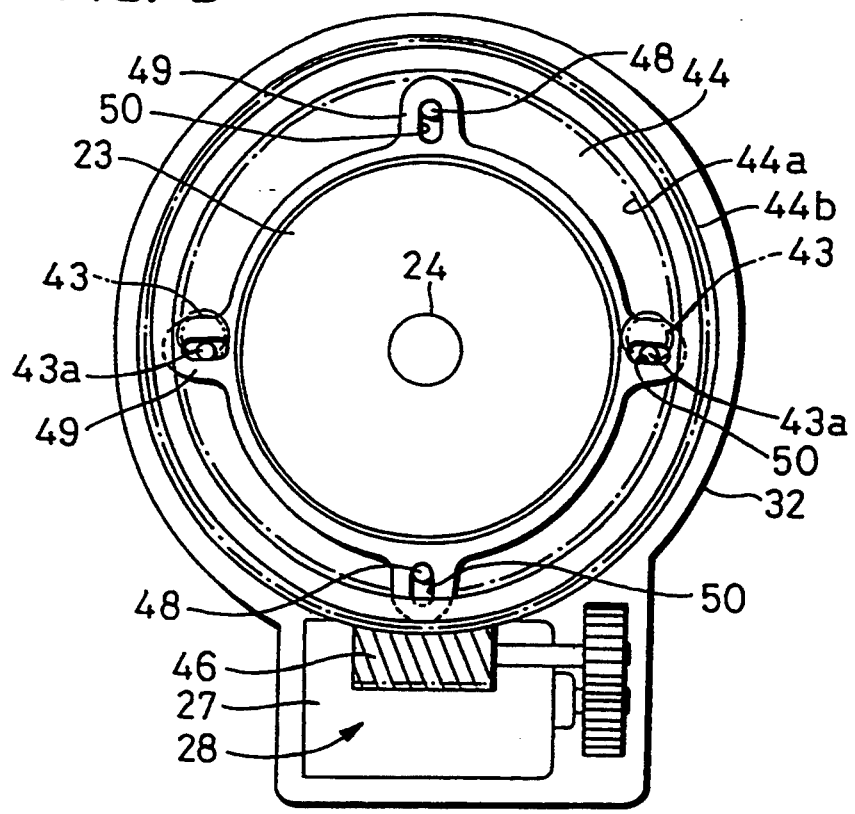
FIG. 5 is a front view showing essential components of the reflector driving device.
Figure 6:
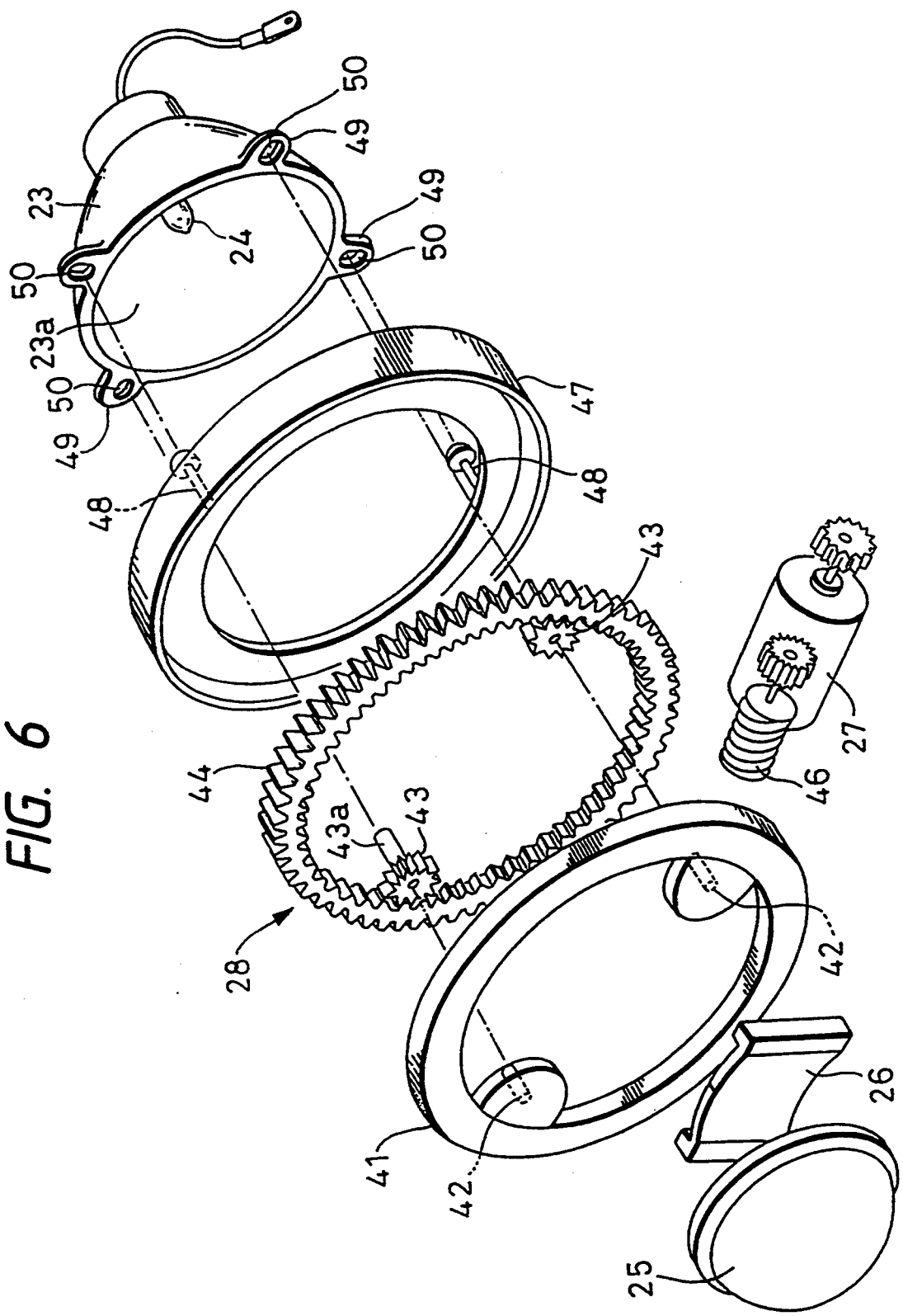
FIG. 6 is an exploded perspective view showing the reflector driving device.

The second projection lamp 2, as shown in FIGS. 1 and 2, includes a movable reflector 23 having an elliptical mirror surface 23a, a light bulb 24 fixedly mounted on the bottom of the movable reflector 23 positioned at the first focal point F1 on the central axis CL of the movable reflector 23, a collimator lens 25 disposed on the central axis CL located in front of the first focal point F1, and a shade 26 positioned at the second focal point F2 between the light bulb 24 and the collimator lens 25. The shade 26 defines the sectional configuration of the output light beam of the light bulb.

The central axis CL of variable reflector 23 is movable in a direction perpendicular to the optical axis L2 of the collimator lens 25 (as indicated by the arrow C in FIG. 2) by a reflector driving device 28. The reflector driving device 28 has an electric motor 27 or the like as its drive source.

The reflector driving device 28 is constructed as shown in FIGS. 3 through 6. As described above, the central axis CL of the movable reflector 23 is moved vertically perpendicular to the optical axis L2 of the collimator lens 25 (see FIG. 2). A ring-shaped supporting frame 41 is fixedly mounted in a lamp body 32 substantially at the middle portion thereof. A pair of gears 43 are fixedly mounted on a pair of respective pin shafts 42 mounted on the ring-shaped supporting frame 41 at positions of 3 o'clock and 9 o'clock (diametrically opposite positions).

The gears 43 are both engaged with the inner gear 44a of a gear ring 44. The outer gear 44b of the gear ring 44 is engaged with a worm gear 46 mounted on the output shaft of the drive motor 27, which is fixedly mounted on the lamp body 32.

An annular slide case 47 (omitted in FIG. 3 for clarity) is rotatably engaged with the outer gear 44b of the gear ring 44 on the side of the movable reflector 23. A pair of guide pins 48 are mounted on the slide case 47 at positions of 12 o'clock and 6 o'clock. The movable reflector 23 has four protrusions 49 extending from the edge of its opening at positions of 12 o'clock, 3 o'clock, 6 o'clock and 9 o'clock. The protrusions 49 have slide holes 50 which are elongated radially. The aforementioned guide pins 48 and pin shafts 43a extending from the gears 43 are slidably engaged with the slide holes 50 of the protrusions 49, thus rotatably supporting the movable reflector 23.

In the second projection lamp 2, the drive motor 27 can be turned in the forward direction or in the reverse direction so that the central axis CL of the movable reflector 23 is moved vertically perpendicular to the optical axis L2 of the collimator lens 25. In this operation, as the drive motor 27 rotates, the gear ring 44 is turned because its outer gear 44b is engaged with the worm gear 46 of the drive motor 27. On the other hand, as described above, the inner gear 44a of the gear ring 44 is engaged with the gears 43 mounted on the pin shafts 42 at positions of 3 o'clock and 9 o'clock. Therefore, the movable reflector 23 is moved vertically on the aforementioned supporting protrusions 49 which, as described above, are provided at positions of 3 o'clock and 9 o'clock where the pin shafts 43a of the gears 43 are engaged with the slide holes 50.

The control of the light distribution pattern produced by the above headlamp system will be described with reference to FIGS. 7A and 7B.

Figure 7A:
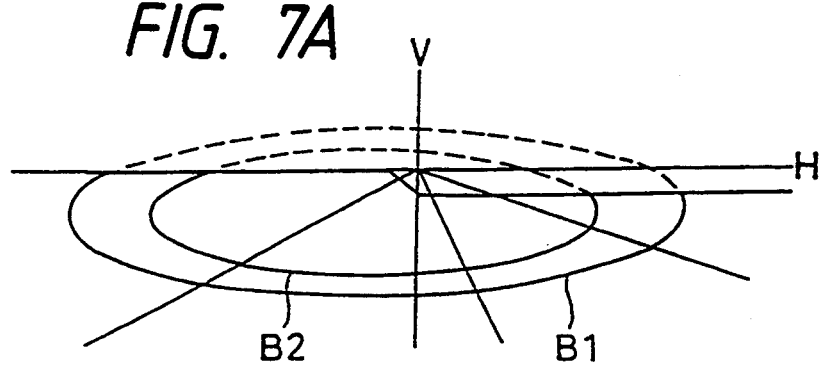
FIG. 7A is an explanatory diagram for a description of a light distribution pattern produced by the headlamp system according to the invention when the road is dry.

(1) In the case where the road is dry:

FIG. 7A shows the light distribution pattern when the road is dry. The stationary light beam B1 of the first projection lamp 1 and the movable light beam B2 of the second projection lamp 2 are set in such a manner that they illuminate the distant part of the road ahead of the vehicle and overlap with each other. In this case, it is preferable that the movable light beam B2 cover an area which is equal to or smaller than the area covered by the stationary light beam B1, with the former B2 being smaller than the latter B1 in luminance.

Figure 7B:
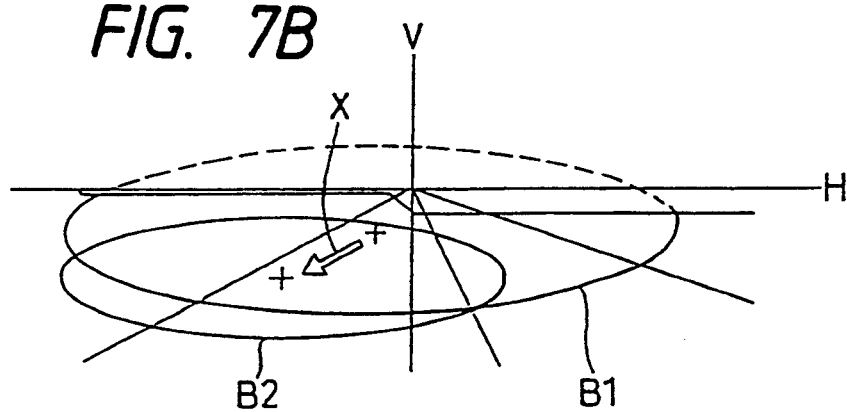
FIG. 7B is an explanatory diagram for a description of a light distribution pattern produced by the headlamp system according to the invention when the road is wet.

(2) In the case where the road is wet:

FIG. 7B shows the light distribution pattern when the road is wet. In this case, the stationary light beam B1 of the first projection lamp 1 illuminates the distant part of the road, while the drive motor 27 is controlled so that the movable light beam B2 of the second projection lamp 2 is deflected downwardly to illuminate the near part of the road. In this case, it is preferable that the light beam B2 be deflected obliquely downwardly, as indicated by the arrow X.

Figure 8:
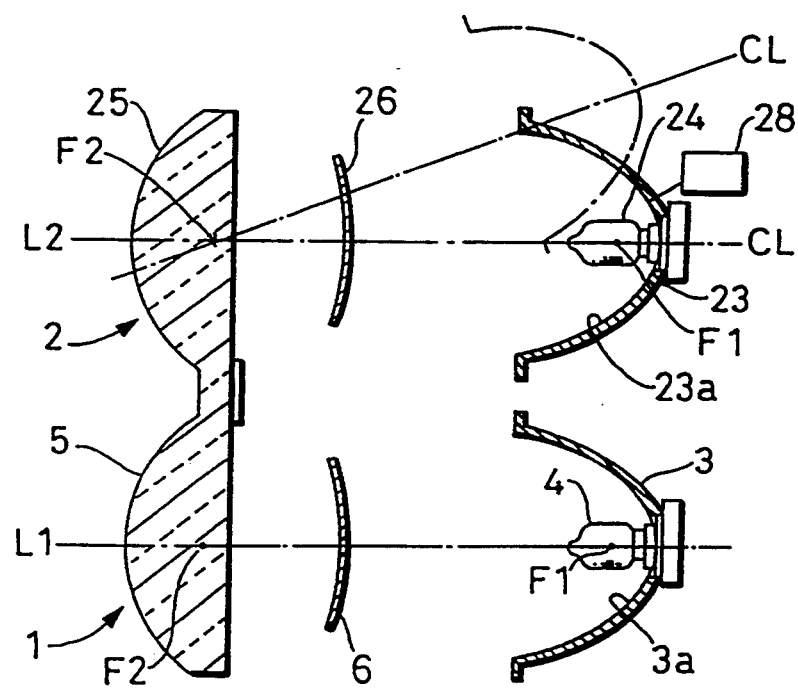
FIG. 8 is a sectional plan view for a description of a second example of the headlamp system according to the invention, showing first and second projection lamps provided on each side of a vehicle.

FIG. 8 shows a second example of a headlamp system according to the invention. In this embodiment, a lamp unit on a side of the vehicle is also constructed with a pair of first and second projection lamps. The first projection lamp emits a light beam which is stationary, while the second projection lamp emits a light beam which is movable in a horizontal plane in association with the steering of the vehicle.

The second example of the headlamp shown in FIG. 8 differs from the above-described first example in that its reflector driving device 28 is designed so that the central axis CL of the movable reflector 23 of the second projection lamp 2 can be deflected horizontally. The reflector driving device 28 is driven in association with the steering of the vehicle, so that the distribution of light is controlled as shown in FIGS. 9A and 9B.

An example of the control of light distribution by the headlamp system designed as described above will be described with reference to FIGS. 9A and 9B.

Figure 9A:
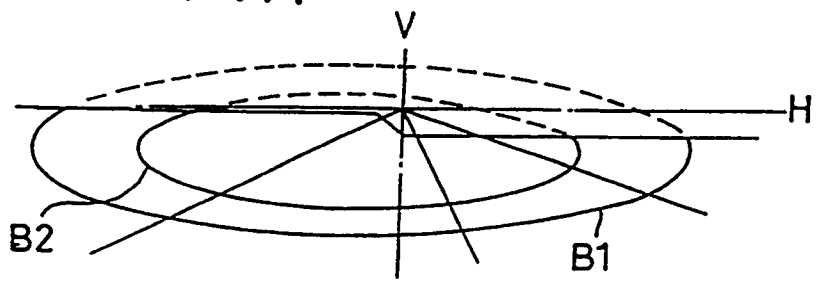
FIG. 9A is an explanatory diagram for a description of a light distribution pattern produced by the headlamp system shown in FIG. 8 when the vehicle moves in a straight line.
Figure 9B:
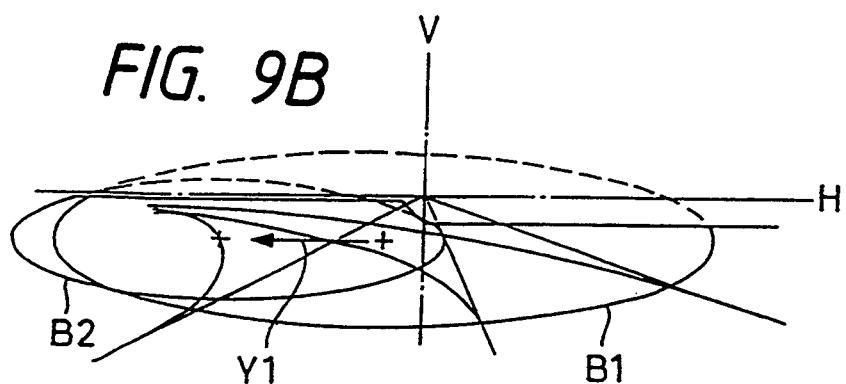
FIG. 9B is an explanatory diagram for a description of a light distribution pattern produced by the headlamp system when the vehicle turns to the left.

(1) In the case where the vehicle is moving in a straight line:

FIG. 9A shows a light distribution pattern obtained when the vehicle is moving in a straight line. The stationary light beam B1 of the first projection lamp 1 and the movable light beam B2 of the second projection lamp 2 are set in such a manner that they illuminate the distant part of the road ahead of the vehicle and overlap with each other. In this case, it is preferable that the area illuminated by the movable light beam B2 be equal to or smaller than the area illuminated by the stationary light beam B1, with the former B2 being smaller than the latter B1 in luminance.

(2) In the case where the vehicle is turning:

FIG. 9B shows a light distribution pattern produced when the vehicle is turning to the left. In this case, the stationary light beam B1 of the first projection lamp 1 illuminates the distant part of the road, while the second projection lamp 2 is driven so that its light beam B2 illuminates the left distant part of the road in association with the steering of the vehicle; that is, the light beam B2 is shifted to the left-hand side of the road (as indicated by an arrow Y1).

Figure 10:
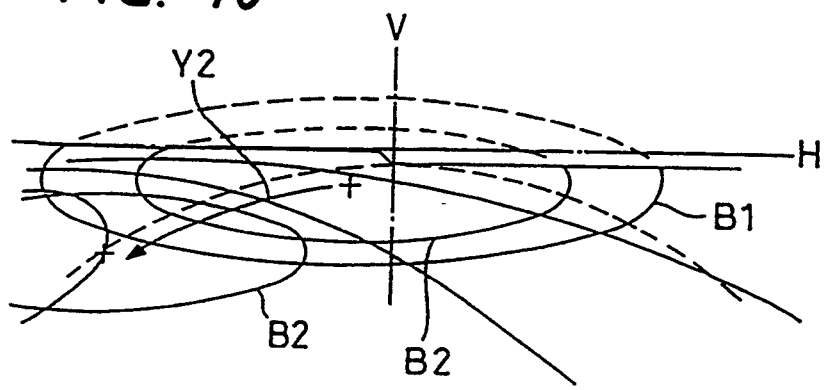
FIG. 10 is a explanatory diagram showing another light distribution pattern for a description of a modification of the headlamp system according to the invention.
Figure 11:
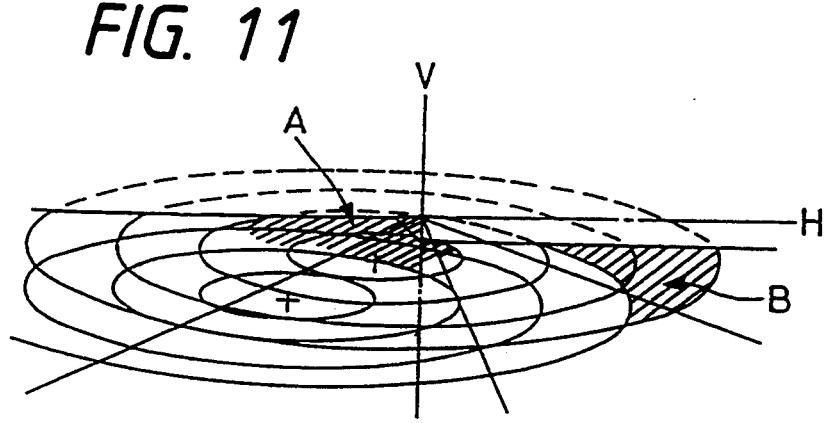
FIG. 11 is an explanatory diagram showing a light distribution pattern produced by a conventional variable-light-beam-pattern type headlamp.

FIG. 10 shows another light distribution pattern for a description of a modification of the variable-light-beam-pattern four-lamp type headlamp system according to the invention. In the modification, the second projection lamp, whose light beam is movable, is operated in association with the steering of the vehicle. The movable reflector 23 of the second projection lamp 2 is driven so that the movable light beam B2 illuminates the near part of the road while shifting sideward; that is, the movable light beam B2 is displaced, forming an arcuate locus as indicated by an arrow Y2.

In the variable-light-beam-pattern four-lamp type headlamp system of the invention, the two lamps provided on each side of the vehicle are constructed of the first projection lamp whose light beam is stationary and the second projection lamp whose light beam is movable. Therefore, the distribution of light provided by the headlamp system can be controlled according to the conditions of the road and the operating conditions of the vehicle. This greatly contributes to safe driving.

While preferred embodiments of the invention have been described, it will be obvious to those skilled in the art that various changes and modifications may be made thereto without departing from the invention, and it is aimed, therefore, to cover in the appended claim all such changes and modifications as fall within the true spirit and scope of the invention.

What is claimed is:

1. A variable-light-beam-pattern four-lamp type headlamp system comprising a pair of lamp units mounted on opposite sides of a vehicle, each of said lamp units comprising a first and a second projection lamp, said first projection lamp emitting a light beam in a fixed direction, and said second projection lamp emitting a light beam in a direction determined in accordance with road conditions and a steering direction of said vehicle, said light beams of said first and second lamps overlapping with one another and combining to form a driving beam, each of said first and second projection lamps comprising a single reflector having a central optical axis, a light source mounted at a focus of said single reflector, and a projection lens, and a reflector driving device for moving said single reflector of said second lamp in a direction determined in accordance with said road conditions and said steering direction of said vehicle to vary an illumination pattern of said driving beam without varying a total amount of illumination of said driving beam.

2. A variable-light-beam-pattern four-lamp type headlamp system comprising a pair of lamp units mounted on opposite sides of a vehicle, each of said lamp units comprising a first and a second projection lamp, said first projection lamp emitting a light beam in a fixed direction, and said second projection lamp emitting a light beam in a direction determined in accordance with road conditions and a steering direction of said vehicle, said light beams of said first and second lamps overlapping with one another and combining to form a driving beam, each of said first and second projection lamps comprising a reflector having a central optical axis, a light source mounted at a focus of said reflector, and a projection lens, and a reflector driving device for moving said reflector of said second lamp in a direction determined in accordance with said road conditions and said steering direction of said vehicle to vary an illumination pattern of said driving beam without varying a total amount of illumination of said driving beam, wherein said reflector of said second lamp is movable in a direction perpendicular to said central optical axis of said reflector of said first lamp.

3. A variable-light-beam-pattern four-lamp type headlamp system comprising a pair of lamp units mounted on opposite sides of a vehicle, each of said lamp units comprising a first and a second projection lamp, said first projection lamp emitting a light beam in a fixed direction, and said second projection lamp emitting a light beam in a direction determined in accordance with road conditions and a steering direction of said vehicle, said light beams of said first and second lamps overlapping with one another and combining to form a driving beam, each of said first and second projection lamps comprising a reflector having a central optical axis, a light source mounted at a focus of said reflector, and a projection lens, and a reflector driving device for moving said reflector of said second lamp in a direction determined in accordance with said road conditions and said steering direction of said vehicle to vary an illumination pattern of said driving beam without varying a total amount of illumination of said driving beam, wherein said reflector of said second lamp is movable in a direction oblique to said central optical axis of said reflector of said first lamp.

4. A variable-light-beam-pattern four-lamp type headlamp system comprising a pair of lamp units mounted on opposite sides of a vehicle, each of said lamp units comprising a first and a second projection lamp, said first projection lamp emitting a light beam in a fixed direction, and said second projection lamp emitting a light beam in a direction determined in accordance with road conditions and a steering direction of said vehicle, said light beams of said first and second lamps overlapping with one another and combining to form a driving beam, each of said first and second projection lamps comprising a reflector having a central optical axis, a light source mounted at a focus of said reflector, and a projection lens, and a reflector driving device for moving said reflector of said second lamp in a direction determined in accordance with said road conditions and said steering direction of said vehicle to vary an illumination pattern of said driving beam without varying a total amount of illumination of said driving beam, wherein said reflector driving device comprises a ring-shaped supporting frame fixedly mounted in a lamp body, a pair of pin shafts mounted on said supporting frame, a pair of gears mounted on respective ones of said pin shafts, a pair of pin shafts extending from said gears, a gear ring having inner teeth engaged with said pair of gears, a drive motor, a worm gear fixed to an output shaft of said drive motor and engaged with outer teeth of said gear ring, an annular slide case rotatable engaged with said outer gear of said gear ring, a pair of guide pins mounted on said slide case, and four protrusions extending from an edge portion of said reflector of said second projection lamp, said protrusions having slide holes therein slidably engaged with respective ones of said guide pins and said pin shafts extending from said gears.

* * * * *